United States Patent
Laminette

(10) Patent No.: US 10,007,123 B2
(45) Date of Patent: Jun. 26, 2018

(54) LUMINOUS MODULE MADE OF TRANSPARENT MATERIAL

(71) Applicant: Valeo Vision, Bobigny (FR)

(72) Inventor: Maxime Laminette, Angers (FR)

(73) Assignee: VALEO VISION, Bobigny (FR)

( * ) Notice: Subject to any disclaimer, the term of this patent is extended or adjusted under 35 U.S.C. 154(b) by 0 days. days.

(21) Appl. No.: 15/263,681

(22) Filed: Sep. 13, 2016

(65) Prior Publication Data

US 2017/0074477 A1    Mar. 16, 2017

(30) Foreign Application Priority Data

Sep. 14, 2015 (FR) ...................................... 15 58511

(51) Int. Cl.
| | |
|---|---|
| *G02B 27/30* | (2006.01) |
| *F21S 8/10* | (2006.01) |
| *F21S 41/147* | (2018.01) |
| *F21S 41/24* | (2018.01) |
| *F21S 41/27* | (2018.01) |
| *F21S 41/32* | (2018.01) |
| *F21S 43/14* | (2018.01) |
| *F21S 43/241* | (2018.01) |
| *F21S 43/243* | (2018.01) |
| *F21S 43/249* | (2018.01) |

(52) U.S. Cl.
CPC ............ *G02B 27/30* (2013.01); *F21S 41/147* (2018.01); *F21S 41/24* (2018.01); *F21S 41/27* (2018.01); *F21S 41/322* (2018.01); *F21S 43/14* (2018.01); *F21S 43/241* (2018.01); *F21S 43/243* (2018.01); *F21S 43/249* (2018.01); *F21S 48/1329* (2013.01)

(58) Field of Classification Search
CPC ... G02B 27/30; F21S 48/1159; F21S 48/1241; F21S 48/1291; F21S 48/1329; F21S 48/215; F21S 48/225; F21S 48/2262; F21S 48/2281
USPC ..................... 362/311.02, 520, 521, 522, 511
See application file for complete search history.

(56) References Cited

U.S. PATENT DOCUMENTS

| | | | |
|---|---|---|---|
| 6,948,838 B2* | 9/2005 | Kunstler ............... | F21S 48/215 362/237 |
| 7,073,931 B2 | 7/2006 | Ishida | |
| 7,290,906 B2* | 11/2007 | Suzuki ................. | B60Q 1/2696 362/328 |
| 2004/0156209 A1 | 8/2004 | Ishida | |
| 2007/0159831 A1* | 7/2007 | Faller ......................... | F21K 9/00 362/311.02 |
| 2010/0135036 A1 | 6/2010 | Matsuba et al. | |

(Continued)

FOREIGN PATENT DOCUMENTS

| | | |
|---|---|---|
| DE | 102008045765 A1 | 3/2010 |
| EP | 2194310 A2 | 6/2010 |
| FR | 3010772 A1 | 3/2015 |

*Primary Examiner* — Laura Tso
(74) *Attorney, Agent, or Firm* — Oblon, McClelland, Maier & Neustadt, L.L.P.

(57) ABSTRACT

A luminous module, especially for an automotive vehicle, comprising a body made of translucent or transparent material with:
- an entrance face for light rays produced by one or more light sources;
- an exit face for light rays in an exit beam; and
- a face for reflecting light rays coming from the entrance face, toward the exit face.

The body comprises at least two distinct optical exit zones.

20 Claims, 2 Drawing Sheets

(56) References Cited

U.S. PATENT DOCUMENTS

2012/0051066 A1* 3/2012 Koo .................. F21V 5/04
                                        362/311.02
2014/0140084 A1* 5/2014 Zwick ................ B60Q 1/26
                                        362/511

* cited by examiner

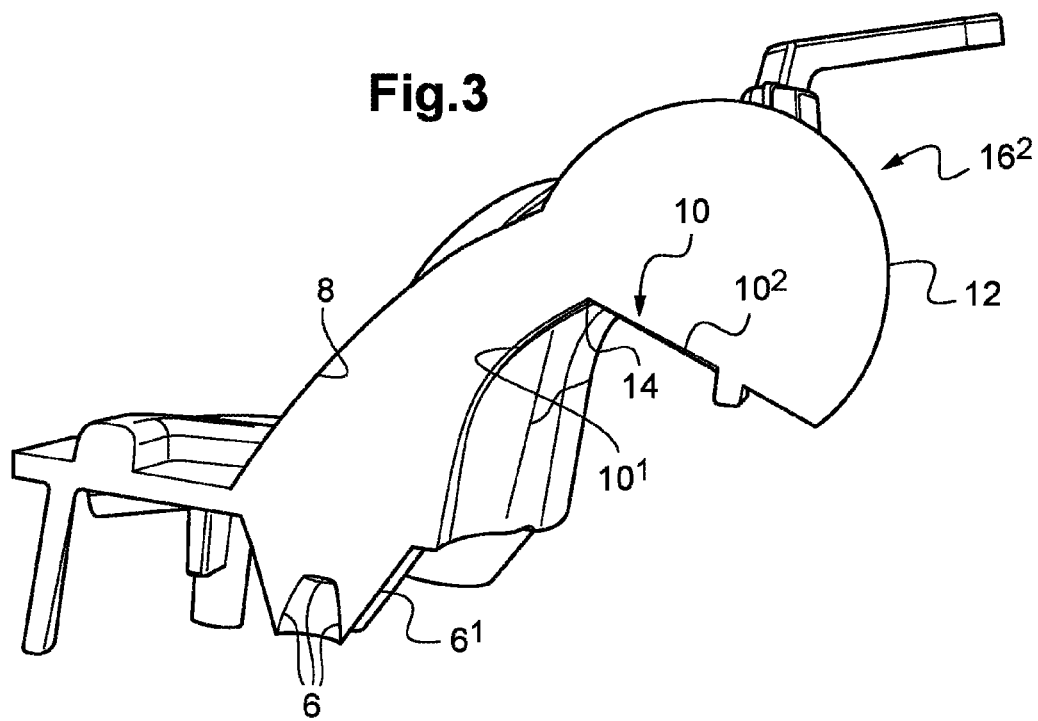
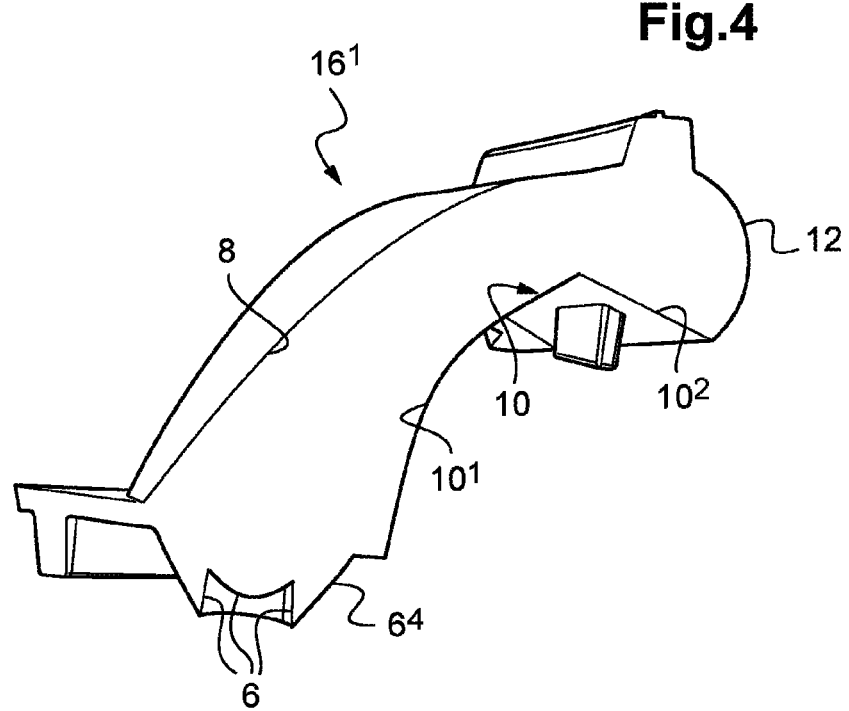

LUMINOUS MODULE MADE OF TRANSPARENT MATERIAL

CROSS-REFERENCE TO RELATED APPLICATIONS

This application claims priority to the French application 1558511, filed Sep. 14, 2015, which application is incorporated herein by reference and made a part hereof.

BACKGROUND OF THE INVENTION

1. Field of the Invention

The invention relates to the field of lighting and especially automotive vehicle lighting. The invention also relates to a lighting headlamp comprising such a module.

2. Description of the Related Art

Published patent document FR 3 010 772 A1 discloses a lighting module with a body made of transparent material comprising an entrance face for the light produced by one or more light sources, a reflecting face with a cut-off edge and an exit face for the rays. The entrance face comprises a cavity formed at one end of the module, in the transparent material, and bounded by a circular surface forming a diopter able to deviate the rays that enter toward the exterior and peripheral surface of the body. The rays are then reflected from the exterior surface, via total internal reflection, in order to converge toward the cut-off edge. The exit face is generally convex and is at the opposite end of the module. The reflecting face is formed by a notch formed in a lateral section of the transparent material, between the entrance and exit faces. The ridge at the bottom of the notch forms the cut-off edge for cutting off the rays and the face of the notch located on the same side as the entrance face forms a reflecting face thanks to total internal reflection. This reflecting face is commonly referred to as the "deflector" because it "deflects" some of the rays toward the bottom of the beam. The rays coming from the entrance face propagate through the transparent material essentially along the longitudinal and optical axis of the module. Most of the rays pass the cut-off edge without undergoing reflection and exit via the exit face. Some of the rays strike the reflecting face or the deflector, which is placed in front of the cut-off edge, and there undergo a reflection toward a high section of the transparent body. These rays then strike the exit face with a large angle of incidence. Thus, they there undergo substantial refraction and are directed toward a low section of the light beam. It is in this way that the edge of the deflector allows a horizontal cut-off to be produced in the light beam. This module is advantageous in that it allows, with a very small number of elements, a high-performance cut-off-containing light beam to be produced. However, it has the drawback that it requires a certain space along the optical axis. Specifically, the longitudinal axis of the transparent body essentially extends along the optical axis of the module. In addition, because of its shape, the exit face cannot be used as a styling face, i.e. a face directly visible from the exterior of the lighting device comprising the module. It is therefore necessary to provide an additional styling surface, thereby further increasing bulk.

SUMMARY OF THE INVENTION

One objective of the invention is to mitigate at least one problem of the prior art, in this case the aforementioned prior art. More precisely, one objective of the invention is to provide a luminous module that is compact, in particular along its optical axis.

One subject of the invention is a luminous module for an automotive vehicle, comprising a body made of translucent or transparent material with:
- an entrance face for light rays produced by one or more light sources;
- an exit face for light rays in an exit beam;
- a face for reflecting light rays coming from the entrance face, toward the exit face; and
- a luminous body comprising at least two distinct optical exit zones.

According to particular embodiments, the module comprises any one of the following features, whether alone or in any technically possible combination:
- one of the optical exit zones has a "cylindrical" optical exit surface;
- the "cylindrical" optical exit zone produces a "flat" beam;
- the reflecting face is facing the "cylindrical" exit face of "parabolic" cross section;
- the reflecting face is convex toward the exterior;
- one of the optical exit zones has a "spherical" optical exit surface;
- the "spherical" optical exit zone produces a "kink" beam;
- the reflecting face has, facing the "spherical" exit face, a "parabolic" surface;
- the reflecting face forms a diopter able to reflect, via total internal reflection, some of the rays coming from the entrance face;
- the reflecting face makes an angle comprised between 5° and 40° to the average direction of the light beams propagating from the entrance face to the reflecting face;
- a cut-off edge is formed by the luminous body, between the reflecting face and the exit face;
- the cut-off edge and the reflecting face are arranged such that light rays issued from the entrance face and arriving at the cut-off edge are first reflected by the reflecting face;
- the entrance face comprises one or more collimators able to deviate the light rays of one or more light sources, respectively, so as to form one or more ray beams that are directed toward the second reflecting face and that pass in front of the cut-off edge;
- the collimator, or each of the collimators, is formed by a protuberance of the body with a circular exterior surface preferably of elliptical profile, the protuberance comprising a cavity able to receive the corresponding light source;
- the collimator, or each of the collimators, is formed by a protuberance of the body, having a circular exterior surface of elliptical profile and a cavity able to receive the corresponding light source;
- the exit beam is a lighting beam containing a horizontal or vertical cut-off; and
- the exit beam is a low-beam type lighting beam.

Another subject of the invention is a lighting headlamp for an automotive vehicle, comprising a casing and at least one luminous module, noteworthy in that the luminous module is according to the invention.

The measures in the invention are advantageous in that they allow a luminous module having a good optical efficacy to be produced.

The use of a dioptric deflector, namely that the first reflecting face reflects rays via total internal reflection, is advantageous especially in that it makes the module more tolerant to focusing defects. Furthermore, it avoids the need to metallize the reflecting face. In addition, the use of a plurality of collimators on the entrance face allows the light beam to be formed and thus means the various functions can be provided with a high degree of flexibility. In addition, the module provides a common exit face, this having advantages in terms of aesthetics and the precision of the complete beam resulting from the addition of the beams produced by the various collimators.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood from the description and drawings, in which:

FIG. 3 is a cross-sectional view of a longitudinal median plane of the module in FIGS. 1 and 2; and FIG. 4 is another cross-sectional view of a longitudinal median plane of the module in FIGS. 1 and 2.

DETAILED DESCRIPTION OF THE PREFERRED EMBODIMENTS

Figure 1:
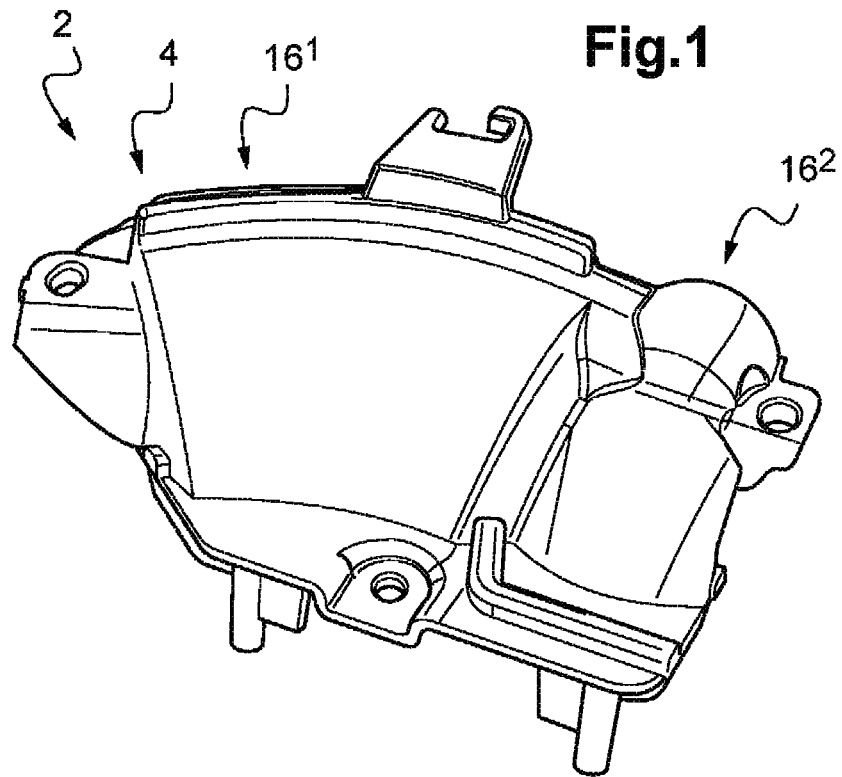
FIG. 1 is a rear perspective top view of a dioptric body of a luminous module according to one aspect of the invention.

FIGS. 1 to 4 illustrate a dioptric body of a luminous module according to the invention. The module 2 essentially comprises the body 4 and light sources (which are not shown).

The body 4 is made mainly and preferably entirely of a transparent or translucent material. This material may be glass or preferably a plastic such as polycarbonate (PC) in particular.

The body 4 comprises an entrance face 6 for the light produced by the light sources. The latter may be light-emitting diodes or even lasers. The body 4 also comprises a reflecting face 8, which is intended to reflect almost all the rays, and an exit face 12.

The entrance face 6 may comprise collimators $6^1$ to $6^5$. They may be seen more clearly in FIG. 2. In this case, they may form protuberances protruding from the body 4 and forming an exterior surface that may be generally circular. Each of these collimators $6^1$ to $6^5$ or protuberances $6^1$ to $6^5$ comprises a cavity intended to receive one of the light sources. The interior surface of the protuberances $6^1$ to $6^5$ bounding the cavity forms a first diopter with the ambient air, refracting rays passing therethrough. The exterior surface of the protuberances $6^1$ to $6^5$ forms a second diopter with the ambient air. Depending on the angle of incidence of the rays striking the surface, the rays may be reflected via total internal reflection. Specifically, in geometric optics, total internal reflection occurs when a light ray strikes the surface separating two media of different refractive indices at an angle of incidence higher than a critical value: there are then no longer any refracted rays transmitted and only a reflected ray remains. This limiting angle of incidence θ is obtained by applying Snell's law, namely $$\theta = \sin^{-1}\frac{n_2}{n_1},$$

where here $n_2$ is the refractive index of air and $n_1$ is the refractive index of the transparent or translucent material forming the protuberance. For a material such as polycarbonate, of refractive index of about 1.591, the limiting angle for refraction θ is about 39°. The exterior surface of the protuberances $6^1$ to $6^5$ forming the second diopters may have a parabolic or elliptical profile.

The body 4 of the module 2 comprises a bottom or intermediate face 10 between the entrance face 6 and the exit face 12. As may be seen particularly well in FIGS. 3 and 4, the intermediate face 10 forms a cut-off edge 14 for cutting off rays propagating through the body 4. Specifically, most of the rays propagate from the entrance face 6 to the reflecting face 8 where they are reflected toward the exit face 12, advantageously via total internal reflection (described above with reference to the protuberances $6^1$ to $6^5$ of the entrance face 6). The rays then pass above the cut-off edge 14 and do not undergo reflection between the reflecting face 8 and the exit face 12. However, some of the rays coming from the reflecting face 8 and from the entrance face 6 strike the intermediate face 10, and more precisely the section of the intermediate face 10 that is adjacent to the cut-off edge 14. These rays are then reflected.

Because of its arrangement with a small angle with respect to the axis of the collimators $6^1$ to $6^5$, the reflecting face 8 has no need to receive a reflective treatment. The effect of the reflection of the rays by the reflecting face 8 is to redirect these rays toward a top section of the exit face 12, with large angles of incidence having the effect of refracting these rays toward a low section of the light beam. The reflecting face 8, in association with the cut-off edge 14, "shields" a portion of the rays in a high section of the light beam, thus ensuring a horizontal beam cut-off function.

The reflecting face 8 advantageously makes an angle comprised between 5° and 40° to the average direction of the light beams propagating from the entrance face 6 to the reflecting face 8.

In FIGS. 3 and 4, it may be seen that the intermediate face 10 may comprise two adjacent sections $10^1$ and $10^2$, these two adjacent sections $10^1$ and $10^2$ forming a ridge corresponding to the cut-off edge 14.

The body 4 furthermore has the particularity of comprising two optical groups $16^1$ and $16^2$.

The right-hand optical group $16^2$ in FIG. 1 is dedicated to forming a "kink" beam, i.e. a beam suitable for forming the inclined profile required by law for a low-beam type beam, which is raised at the edge. The optical group $16^1$ for its part is dedicated to forming the "flat" beam.

In each of the two optical groups $16^1$ and $16^2$, the reflecting face 8, the intermediate face 10 and above all the exit face 12 have a shape suitable for the respective group $16^1$, $16^2$.

In the optical group $16^1$, the reflective face 8 is of parabolic cross section, each parabolic section having a focal point on the cut-off edge 14. The general shape of the reflecting face 8 is furthermore concave, this having the advantage of allowing the beam to be distributed horizontally over the exit surface 12, even though the light sources are grouped in individual wells. However, as a variant, the reflecting face 8 has any shape suitable for shaping the light beams coming from the collimators $6^1$ to $6^5$, on the way to the exit face 12. It is for example a question of an elliptical shape.

The exit face 12 has the particularity of being cylindrical, i.e. of being a cylindrical segment, the generatrix of which is curved in this precise case. The exit face 12 is therefore of constant vertical cross section. However, as a variant, the exit face 12 is of any type suitable for projecting the light beam coming from the reflecting face 8 to infinity on the road.

In the optical group 16$^2$, the reflecting face 8 is for its part of parabolic cross section and has the cut-off edge 14 as focal point. However, as a variant, the reflecting face 8 has any shape suitable for shaping the light beams coming from the collimators 6$^1$ to 6$^5$, on the way to the exit face 12. It is for example a question of an elliptical shape.

Furthermore, the reflecting face 8 has a parabolic general shape so as to converge the beam toward the median plane of the exit face 12. Generally, the general shape of the reflecting face 8 is suitable for converging the light beam toward the median plane of the exit face 12.

The exit face 12 of the optical group 16$^2$ has the particularity of being spherical, i.e. of being obtained from a spherical segment. As a variant, it may however have any type of shape suitable for producing a concentrated high-flux beam.

Figure 2:
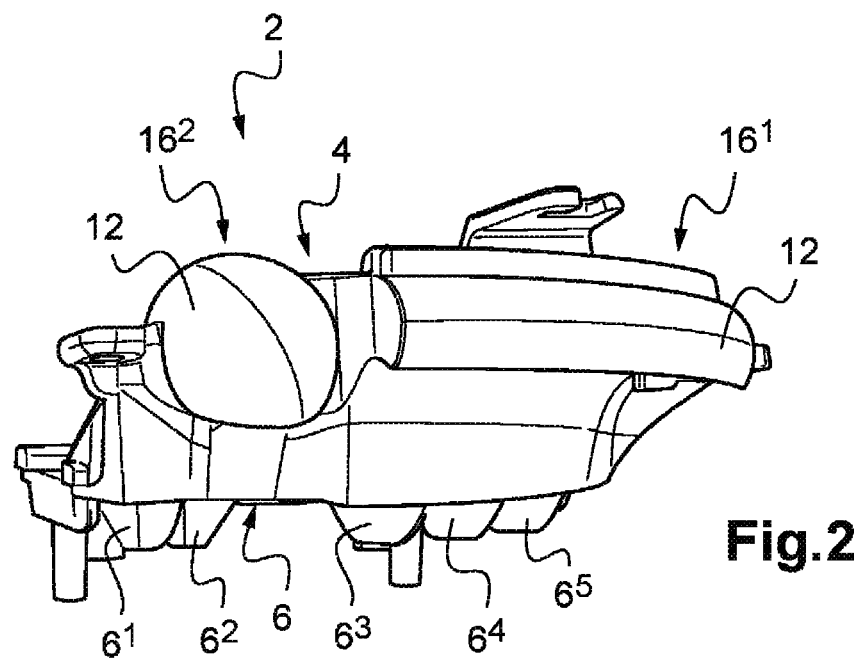
FIG. 2 is a front perspective side view of the body in FIG. 1.

As may be seen in FIG. 2, the entrance face 6 may comprise a plurality of converging collimators 6$^1$ to 6$^5$.

As a variant, it is a question of collimators 6$^1$ to 6$^5$ of any type suitable for producing a substantially parallel beam.

The light sources of the module(s) 2 may be placed on a common carrier, such as for example a flex printed-circuit or power-supply board.

One or more modules 2 such as described above may be integrated into a casing with a view to producing a headlamp.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A luminous module within an automotive vehicle headlamp assembly, the luminous module comprising:
    a housing body made of translucent or transparent material, the housing body including
        an entrance face for light rays produced by one or more light sources,
        an exit face for light rays in an exit beam, and
        a face for reflecting light rays coming from said entrance face, toward said exit face,
    said housing body comprising at least two distinct optical exit zones.

2. The luminous module according to claim 1, wherein one of said optical exit zones has a cylindrical optical exit surface.

3. The luminous module according to claim 2, wherein said cylindrical optical exit surface produces a high beam.

4. The luminous module according to claim 2, wherein said reflecting face is facing said cylindrical optical exit surface of a parabolic cross section.

5. The luminous module according to claim 4, wherein said reflecting face is of a concave shape.

6. The luminous module according to claim 1, wherein one of said optical exit zones has a spherical optical exit surface.

7. The luminous module according to claim 6, wherein said spherical optical exit zone produces a kink beam.

8. The luminous module according to claim 1, wherein said reflecting face is facing a spherical optical exit surface of a parabolic cross section.

9. The luminous module according to claim 8, wherein said reflecting face has a parabolic general shape.

10. The luminous module according to claim 1, wherein said reflecting face forms a diopter able to reflect, via total internal reflection, some of said light rays coming from said entrance face.

11. The luminous module according to claim 1, wherein said reflecting face makes an angle comprised between 5° and 40° to the average direction of said light rays propagating from said entrance face to said reflecting face.

12. The luminous module according to claim 1, wherein a cut-off edge is formed by said housing body, between said reflecting face and said exit face.

13. The luminous module according to claim 12, wherein said cut-off edge and said reflecting face are arranged such that said light rays issued from said entrance face and arriving at said cut-off edge are first reflected by said reflecting face.

14. The luminous module according to claim 1, wherein said entrance face comprises one or more collimators able to deviate said light rays of said one or more light sources, respectively, so as to form one or more ray beams that are directed toward a second reflecting face and that pass in front of a cut-off edge.

15. The luminous module according to claim 14, wherein said one or more collimators is formed by a protuberance of said housing body with a circular exterior surface of elliptical profile, said protuberance comprising a cavity able to receive a corresponding light source.

16. The luminous module according to claim 14, wherein said one or more collimators is formed by a protuberance of said housing body, having a circular exterior surface of elliptical profile and a cavity able to receive a corresponding light source.

17. The luminous module according to claim 1, wherein said exit beam is a lighting beam containing a horizontal or vertical cut-off.

18. The luminous module according to claim 17, wherein said exit beam is a low-beam type lighting beam.

19. A lighting headlamp for an automotive vehicle, comprising a casing and at least one luminous module, wherein said luminous module is according to claim 1.

20. The luminous module according to claim 3, wherein said reflecting face is facing said cylindrical optical exit surface of a parabolic cross section.

* * * * *